United States Patent
Haas et al.

(10) Patent No.: US 7,087,657 B2
(45) Date of Patent: Aug. 8, 2006

(54) STABLE POLYOL DISPERSIONS, POLYURETHANE MOLDINGS PRODUCED THEREFROM, AND THEIR USE

(75) Inventors: Peter Haas, Haan (DE); Alfred Neuhaus, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/736,164

(22) Filed: Dec. 15, 2003

(65) Prior Publication Data

US 2004/0127591 A1  Jul. 1, 2004

(30) Foreign Application Priority Data

Dec. 18, 2002 (DE) ................................ 102 59 184

(51) Int. Cl.
*C08G 18/28* (2006.01)

(52) U.S. Cl. ................... 521/174; 521/114; 521/116; 521/117; 521/170; 252/182.24; 252/182.27; 252/182.28

(58) Field of Classification Search ................ 521/159, 521/114, 116, 117, 170, 174; 252/182.24, 252/182.27, 182.28
See application file for complete search history.

(56) References Cited

U.S. PATENT DOCUMENTS

| 4,201,847 | A | 5/1980 | Kleimann et al. | 521/172 |
|---|---|---|---|---|
| 4,254,228 | A | 3/1981 | Kleimann et al. | 521/128 |
| 4,889,908 | A | 12/1989 | Franke et al. | 521/115 |
| 5,681,915 | A | 10/1997 | Lechner et al. | 528/74.5 |
| 6,221,929 | B1 | 4/2001 | Ryugo et al. | 521/114 |
| 6,316,514 | B1 | 11/2001 | Falke et al. | 521/174 |
| 6,552,153 | B1 | 4/2003 | Kaufhold et al. | 528/49 |

FOREIGN PATENT DOCUMENTS

| CA | 2 375 285 | 12/2000 |
|---|---|---|
| DE | 196 30 281 | 1/1998 |
| DE | 198 12 174 | 9/1999 |
| DE | 199 36 481 | 2/2001 |
| GB | 1 365 215 | 8/1974 |

*Primary Examiner*—John M. Cooney, Jr.
(74) *Attorney, Agent, or Firm*—Joseph C. Gil; N. Denise Brown

(57) ABSTRACT

The present invention relates to polyol dispersions with long-term stability, to cellular polyurethane moldings produced therewith, to processes for their preparation and to their use.

5 Claims, No Drawings

STABLE POLYOL DISPERSIONS, POLYURETHANE MOLDINGS PRODUCED THEREFROM, AND THEIR USE

BACKGROUND OF THE INVENTION

The present invention relates to polyol dispersions with long-term stability, to cellular polyurethane moldings produced therewith, to processes for their preparation and to their use.

DE-A 2 307 589 describes the production of easy-release polyurethane moldings (PUR moldings) using polyisocyanates modified with fatty acid esters. DE-A 2 121 670 discloses the production of easy-release PUR moldings using special release agents introduced into the reaction via the polyol. To achieve a substantial release effect, the release agents are preferably added to both the isocyanate component and the polyol component before they are reacted together.

In recent years, attempts have been made preferentially to dispense with the conventional physical blowing agents in the production of PUR moldings. When using water as the blowing agent, however, the conventional polyol formulations tend to exhibit greater instability and more rapid phase separation, so either they cannot be stored for long periods or expensive measures have to be taken to prevent phase separation.

The object of the present invention was therefore to provide polyol formulations for the production of cellular polyurethane moldings with good release properties which, although they contain water as the blowing agent, are sufficiently stable and only exhibit phase separation after prolonged storage, if at all.

Surprisingly, it has been found that, by using specific release agents, not only is a good release of the molding assured, but also the polyol formulation prepared which contains these mold release agents, is stable and only tends to exhibit phase separation after a prolonged period, if at all.

SUMMARY OF THE INVENTION

The present invention provides stable dispersions of polyol formulations which are suitable for polyurethane moldings. These stable dispersions comprise:
a) a polyol component comprising:
   a1) one or more polyetherpolyols with an OH number of 350 to 1830 mg KOH/g and a functionality of 2 to 8, and
   a2) optionally up to 40 wt. %, based on the combined weight of components a)+b), of one or more polyesterpolyols with an OH number of 250 to 500 mg KOH/g and a functionality of 2 to 3,
b) optionally, one or more polyetherpolyols with an OH number of 15 to 250 mg KOH/g and a functionality of 2 to 6,
c) one or more release agents selected from the group consisting of:
   c1) one or more release agents containing ester groups and comprising the reaction product of:
      (i) one or more fatty acids having 10 to 40 carbon atoms,
      (ii) optionally, one or more dicarboxylic acids or polycarboxylic acids, and
      (iii) one or more polyetherpolyols with ethylene oxide and/or propylene oxide units in the molecule with an OH number of 200 to 1,000 KOH/g and a functionality of 2 to 6, wherein up to 50 equivalent percent of these polyetherpolyols may be replaced by other polyols which are free of ethylene oxide and/or propylene oxide units in the molecule;
   c2) one or more release agents containing amide groups, and
   c3) mixtures thereof;
d) optionally, water or a mixture thereof with one or more physical blowing agents,
e) optionally, one or more activators,
f) optionally, one or more stabilizers, and
g) optionally, other additives and/or auxiliary substances, The present invention also provides cellular polyurethane moldings comprising the reaction product of the stable dispersions of polyol formulations as described above with organic isocyanates such as organic polyisocyanates, modified organic polyisocyanates and organic polyisocyanate prepolymers.

The process of preparing the stable dispersions according to the present invention is another aspect of the present invention. This process comprises mixing components a) to g) as described above together.

The process for the production of the cellular polyurethane moldings of the present invention comprises reacting the dispersions according to the invention with one or more organic isocyanates.

The following may be mentioned as preferred isocyanate components:

Polyisocyanates of the diphenylmethane series including, for example diphenylmethane 4,4'-diisocyanate, diphenylmethane 2,4'-diisocyanate, polymeric diphenylmethane diisocyanates, such as those obtained by the phosgenation of aniline/formaldehyde condensation products, and liquefied or modified diphenylmethane diisocyanates, such as those obtainable by reaction with carbodiimide or urethane. Modified isocyanates are understood as meaning, for example, isocyanurates, biurets, allophanates and uretdiones.

Polyisocyanates of the toluene diisocyanate series are also preferred.

The polyetherpolyol of component a) in the present invention preferably consists of compounds containing reactive OH groups which have an OH number of 350 to 1830 mg KOH/g. These polyhydroxyl compounds preferably have from 2 to 8 hydroxyl groups, more preferably from 2 to 6 hydroxyl groups, and are made up of ether groups. These polyetherpolyols are preferably prepared by the known processes involving the addition of propylene oxide and/or ethylene oxide onto starter compounds such as, for example, glycerol, trimethylolpropane, pentaerythritol, sorbitol and/or sucrose. These polyetherpolyols preferably have predominantly secondary OH groups, but primary OH groups may also be present in the polyetherpolyols.

If present, the polyesterpolyol of component a) in accordance with the present invention preferably comprises compounds prepared by the condensation of dicarboxylic acids or dicarboxylic anhydrides such as, for example, adipic acid, phthalic anhydride and maleic anhydride, with glycols such as, for example, ethylene glycol, propylene glycol, butanediol, glycerol and trimethylolpropane. Suitable polyesterpolyols generally have an OH number of 250 to 500 mg KOH/g and a functionality of 2 to 3.

The polyetherpolyols suitable for component b) in accordance with the present invention generally have an OH number of 15 to 250 mg KOH/g and a functionality of 2 to 6. Suitable polyetherpolyols are preferably prepared by the addition of propylene oxide and/or ethylene oxide onto a suitable starter compound such as, for example, trimethylolpropane, glycerol, propylene glycol, pentaerythritol, sorbitol, bisphenol A and/or hydroquinone.

Suitable release agents for the present invention are selected from the group consisting of c1) release agents containing ester groups, c2) release agents containing amide groups and c3) mixtures thereof.

Suitable release agents containing ester groups to be used as component c1) are those comprising the reaction product of (i) one or more fatty acids having 10 to 40 carbon atoms, (ii) optionally, one or more dicarboxylic or polycarboxylic acids, and (iii) one or more polyetherpolyol components with an OH number of 200 to 1000 mg KOH/g and a functionality of 2 to 6. Suitable polyetherpolyols for (iii) are preferably those components based on glycerol, pentaerythritol, sorbitol and trimethylolpropane as starters, and alkoxylated with ethylene oxide. Release agents c1) are obtained by esterifying these polyetherpolyols with fatty acids which preferably have 10 to 40 carbon atoms. The suitable fatty acids include, for example, oleic acid, linoleic acid, stearic acid, soya oil fatty acid and montan wax acid. The esterification can optionally be carried out in the presence of one or more dicarboxylic or polycarboxylic acids.

The polyetherpolyol component used for the preparation of the release agents which contain ester groups, i.e. component c1), is preferably a polyetherpolyol based on ethylene oxide (preferably from 60 to 100 mol %, based on 100 mol % of ethylene oxide and propylene oxide), and optionally, corresponding proportions of propylene oxide, with suitable compounds as starters including, for example, 1,4-butanediol, ethylene glycol, 1,6-hexanediol, trimethylolpropane, pentaerythritol, glycerol, sorbitol, bisphenol A and mixtures thereof.

If present, release agents c2) which preferably consists of amide salts, such as, for example, those obtainable by reacting amines with a molar excess of fatty acids having 10 to 40 carbon atoms. The amines contain at least one tertiary amino group and at least one primary or secondary amino group.

It is preferable to use one or more activators in order to accelerate the blowing and crosslinking reaction. Examples of suitable activators being 1,4-diazabicyclo[2.2]octane, dimethylcyclohexylamine, bis(2-dimethylaminoethyl)methylamine, dimethylbenzylamine, tin(II) di-2-ethylhexoate and dimethyltin(IV) dilaurate.

The suitable stabilizers for the present invention include, preferably, the known polysiloxanes modified by polyethylene oxide, polypropylene oxide and polyetherpolyols.

Examples of other additives which may also be used in the present invention include flameproofing agents, dyes, anti-ageing additives and emulsifiers.

The dispersions according to the invention are preferably used in the production of cellular moldings.

The invention will be illustrated in greater detail with the aid of the Examples which follow.

EXAMPLES

The following components were used in the examples:

| A. Component c1) containing ester groups [fatty acid polyester; FAPE]: | |
|---|---|
| FAPE 1: | the reaction product of 3390 g of oleic acid, 292 g of adipic acid and 580 g of pentaerythritol; having an OH number of 54.3 and an acid number of 25.5 |
| FAPE 2: | the reaction product of 1685 g of oleic acid, 146 g of adipic acid and 447 g of trimethylolpropane; having an OH number of 42 and an acid number of 2 |
| FAPE 3: | the reaction product of 1695 g of oleic acid, 146 g of adipic acid and 560 g of a polyether with an OH number of 1000 prepared by the addition of propylene oxide onto trimethylolpropane as starter; wherein the reaction product had an OH number of 53 and an acid number of 2.5 |
| FAPE 4: | the reaction product of 4237 g of oleic acid, 365 g of adipic acid and 2540 g of a polyether with an OH number of 600 prepared by the addition of propylene oxide onto trimethylolpropane as starter; wherein the reaction product had an OH number of 44 and an acid number of 2 |
| FAPE 5: | the reaction product of 4236 g of oleic acid, 365 g of adipic acid and 2540 g of a polyether with an OH number of 600 prepared by the addition of ethylene oxide (EO) onto trimethylolpropane (TMP) as starter; wherein the reaction product had an OH number of 44 and an acid number of 2 |
| FAPE 6: | the reaction product of 847 g of oleic acid, 73 g of adipic acid and 494 g of a polyether with an OH number of 600 prepared by the addition of propylene oxide (PO) onto pentaerythritol as starter; wherein the reaction product had an OH number of 45 and an acid number of 3 |
| FAPE 7: | the reaction product of 3560 g of oleic acid, 306 g of adipic acid, 533 g of a polyether with an OH number of 600 prepared by the addition of EO onto TMP, and 1600 g of a polyether with an OH number of 600 prepared by the addition of PO onto TMP; wherein the reaction product had an OH number of 47 and an acid number of 2.7 |
| FAPE 8: | the reaction product of 1695 g of oleic acid, 306 g of adipic acid, 508 g of a polyether with an OH number of 600 prepared by the addition of EO onto TMP, and 223 g of trimethylolpropane; wherein the reaction product had an OH number of 43 and an acid number of 2 |
| FAPE 9: | the reaction product of 1695 g of oleic acid, 146 g of adipic acid and 560 g of a polyether with an OH number of 1000 prepared by the addition of EO onto glycerol; wherein the reaction product had an OH number of 43 and an acid number of 2 |

These fatty acid polyester products were prepared by heating the components at 160° C.–200° C. over approx. 20 hours, followed by esterification for 10 hours at 200° C. under vacuum. The acid number, the OH number and the molecular weight of the resultant product were determined.

B. Component a):

Polyetherpolyol 1:

Polyether having an OH number of 830 obtained by the addition of propylene oxide onto trimethylolpropane.

C. Component b):

Polyetherpolyol 2:

Polyether having an OH number of 42 (with mostly secondary OH-groups) obtained by the addition of propylene oxide and ethylene oxide (as a mixture) onto a mixture of trimethylolpropane and propylene glycol (molar ratio 3:1).

D. Activators e) and Stabilizers f):
  Stabilizer: Tegostab B 84 11 from Goldschmidt
  Activator: Desmorapid® 726 b from Bayer AG E. Isocyanate:
  95 parts by weight (0.38 mol) of a polyisocyanate prepared by the phosgenation of aniline/formaldehyde condensation products and having a viscosity of 320 cP at 25° C. and an NCO content of 31.5 wt. %, and
  5 parts by weight (0.004 mol) of a fatty acid ester comprising the reaction product of:
    544 parts by weight of pentaerythritol, 3390 parts by weight of oleic acid and 292 parts by weight of adipic acid;
    wherein the resultant fatty acid ester was characterized by an OH number of 19.5, an acid number of 25.0, and a molecular weight of about 1100
  The two components were reacted at 70° C. The reaction mixture was kept at 70° C. for 4 hours, with stirring. When the reaction was complete, the NCO content of the polyisocyanate containing the reaction product was 29 wt. %.

F. Release Agents c2) Containing Amide Groups:
  Amidoamine/oleic acid salt (prepared from 1 mol of 3-dimethylamino-1-aminopropane and 2 mol of oleic acid)

Preparation of the Dispersions and Their Stability:
  Components a) to g) were mixed at 1000 rpm for 60 seconds at room temperature by means of a Pendraulik stirrer and left to stand in a closed vessel. The settling behavior of the dispersions prepared in this way was observed. The results and the compositions (in parts by weight) can be found in the Table below:

TABLE 1

Stability of the dispersions

| Component | 1* | 2* | 3* | 4 | 5 | 6 | 7 | 8 | 9 | 10 |
|---|---|---|---|---|---|---|---|---|---|---|
| Polyether 1 | 60 | 60 | 60 | 60 | 60 | 60 | 60 | 60 | 60 | 60 |
| Polyether 2 | 40 | 40 | 40 | 40 | 40 | 40 | 40 | 40 | 40 | 40 |
| Amidoamine | 3 | 3 | 3 | 3 | 3 | 3 | 3 | 3 | 3 | 3 |
| Water | — | 0.5 | 0.5 | 0.5 | 0.5 | 0.5 | 0.5 | 0.5 | 0.5 | 0.5 |
| FAPE 1 | 3 | 3 | | | | | | | | |
| FAPE 2 | | | 3 | | | | | | | |
| FAPE 3 | | | | 3 | | | | | | |
| FAPE 4 | | | | | 3 | | | | | |
| FAPE 5 | | | | | | 3 | | | | |
| FAPE 6 | | | | | | | 3 | | | |
| FAPE 7 | | | | | | | | 3 | | |
| FAPE 8 | | | | | | | | | 3 | |
| FAPE 9 | | | | | | | | | | 3 |
| Stability in days | 13 | 4 | 5 | 10 | 20 | >50 | 20 | 35 | 23 | 25 |

*Comparative dispersions; the amounts are given in parts by weight

Examples 4 to 10 in Table 1 show the markedly improved stability of the polyetherpolyol dispersions according to the invention.

The behavior of the fatty acid polyester FAPE 5 was outstanding, with a dispersion stability of over 50 days.

The proportionate accompanying use of a polyetherpolyol for the preparation of component c1) together with trimethylolpropane (see, for example, dispersion 9 which containing FAPE 8) already improved the stability to 23 days, compared with dispersion 3 which contained FAPE 2, prepared with trimethylolpropane as the polyol component. Dispersion 3 had a stability of only 5 days.

An increased stability of the dispersions which contain fatty acid polyesters, i.e. release agents c1), was also achieved without amidoamines, i.e. release agents c2). See Table 2 below.

TABLE 2

Stability of the dispersions without c2)

| | Dispersion no. | |
|---|---|---|
| Component | 11* | 12 |
| Polyether 1 | 60 | 60 |
| Polyether 2 | 40 | 40 |
| Water | 0.5 | 0.5 |
| FAPE 1 | 3.0 | — |
| FAPE 5 | — | 3.0 |
| Stability in days | 1 | 25 |

*Comparative dispersion; the amounts are given in parts by weight

Example 12 in Table 2 shows that the dispersion containing fatty acid polyester c1) according to the invention had a substantially longer stability than dispersion 11 not according to the invention.

Production of the PUR Moldings and Their Release Properties:

The starting components in Table 3 were used in the amounts shown.

The polyol mixture and blowing agents were fed into a 2-component proportioning mixer, where they were mixed vigorously with the polyisocyanate to produce the foaming reaction mixture and transferred immediately to an aluminium mold heated to 60° C.

The mold had dimensions of 200×300×10 mm. Both the mold and the molding of the clamping unit were kept at a temperature of 60° C.

An external release agent was not used.

The composition of the moldings in parts by weight, and the results of the tests, can be found in the Table below:

TABLE 3

Properties of the PUR moldings and their composition

| Component | Example no. | | | | |
|---|---|---|---|---|---|
| | 1 (comparative) | 2 | 3 | 4 | 5 |
| Polyol 1 [parts by weight] | 60 | 60 | 60 | 60 | 60 |
| Polyol 2 [parts by weight] | 40 | 40 | 40 | 40 | 40 |
| Amidoamine salt [parts by weight] | 3 | 3 | 3 | 3 | — |
| Stabilizer B 84 11 [parts by weight] | 0.8 | 0.8 | 0.8 | 0.8 | 0.8 |
| Activator: Desmorapid 726 b [parts by weight] | 1.0 | 1.0 | 1.0 | 1.0 | 1.2 |
| Water [parts by weight] | 0.5 | 0.5 | 0.5 | 0.5 | 0.5 |
| FAPE 2 [parts by weight] | 3 | | | | |
| FAPE 5 [parts by weight] | | 3 | | | 3 |
| FAPE 7 [parts by weight] | | | 3 | | |
| FAPE 9 [parts by weight] | | | | 3 | |
| Mixing ratio: 100 parts by weight of polyol formulation to parts by weight of isocyanate Index 100 | 132 | 132 | 132 | 132 | 134 |
| Bulk density of mold [kg/m$^3$] | 600 | 600 | 600 | 600 | 600 |
| Demolding time [min] | 3 | 3 | 3 | 3 | 3 |
| Shore D hardness | 70 | 70 | 70 | 70 | 70 |
| Number of demolded parts with slab dimensions of 300 × 200 × 10 mm | >35 | >35 | >35 | >35 | >35 |

The release properties of the PU moldings according to the invention were perfect in all the Examples in Table 3.

The experiments were discontinued after the 35th demolding in each case because the moldings and the material in the sprue region were easily removable.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Stable dispersions of polyol formulations which comprise:
   a) a polyol component comprising:
      a1) one or more polyetherpolyols with an OH number of 350 to 1830 mg KOH/g and a functionality of 2 to 8, and
      a2) optionally up to 40 wt. %, based on the combined weight of a) and b), of one or more polyesterpolyols with an OH number of 250 to 500 mg KOH/g and a functionality of 2 to 3,
   b) optionally, one or more polyetherpolyols with an OH number of 15 to 250 mg KOH/g and a functionality of 2 to 6,
   c) one or more release agents comprising:
      c1) one or more release agents containing ester groups, said release agent being characterized by an OH number of about 43 to about 53, and comprising the reaction product of:
         (i) one or more fatty acids having 10 to 40 carbon atoms,
         (ii) optionally, one or more dicarboxylic acids or polycarboxylic acids, and
         (iii) one or more polyetherpolyols with an OH number of 200 to 1,000 kOH/g and functionally of 2 to 6, in which the polyether-polyol is prepared from an initiator selected from the group consisting of 1,4-butanediol, ethylene glycol, 1,6-hexanediol, trimethylol-propane, pentaerythritol, glycerol, sorbitol, bisphenol A and mixtures thereof, and wherein up 50 equivalent percent of said polyether- polyol component may be replaced by other polyols which are free of ethylene oxide and/or propylene oxide units in the molecule;
      and, optionally,
      c2) one or more release agents containing amide groups,
   d) optionally, water or a mixture thereof with one or more physical blowing agents,
   e) optionally, one or more activators,
   f) optionally, one or more stabilizers, and
   g) optionally, other additives and auxiliary substances.

2. The stable dispersions of claim 1, wherein c1) said release agents which contain ester groups comprise the reaction product of:
   (i) one or more fatty acids having 10 to 40 carbon atoms,
   (ii) optionally, one or more dicarboxylic or polycarboxylic acids, and
   (iii) one or more polyetherpolyol components with an OH number of 400 to 800 mg KOH/g, and a functionality of 2 to 4.

3. A process for the preparation of the stable dispersions of claim 1, comprising (I) mixing components a) through g) together.

4. A cellular polyurethane molding, comprising the reaction product of:
   A) one or more organic isocyanates, and
   B) the stable dispersions of claim 1.

5. A process for the production of cellular polyurethane moldings, comprising:
   (I) reacting
      A) one or more organic isocyanates from the group consisting of organic polyisocyanates, modified organic polyisocyanates, and organic polyisocyanate prepolymers, with
      B) the stable dispersions of polyol formulations of claim 1.

* * * * *